Jan. 20, 1959 B. A. LUNDQUIST 2,869,926
DEVICE FOR DISSOLVING AND MIXING SOLUBLE
SOLID FERTILIZERS IN FLOWING WATER
Filed Dec. 26, 1956
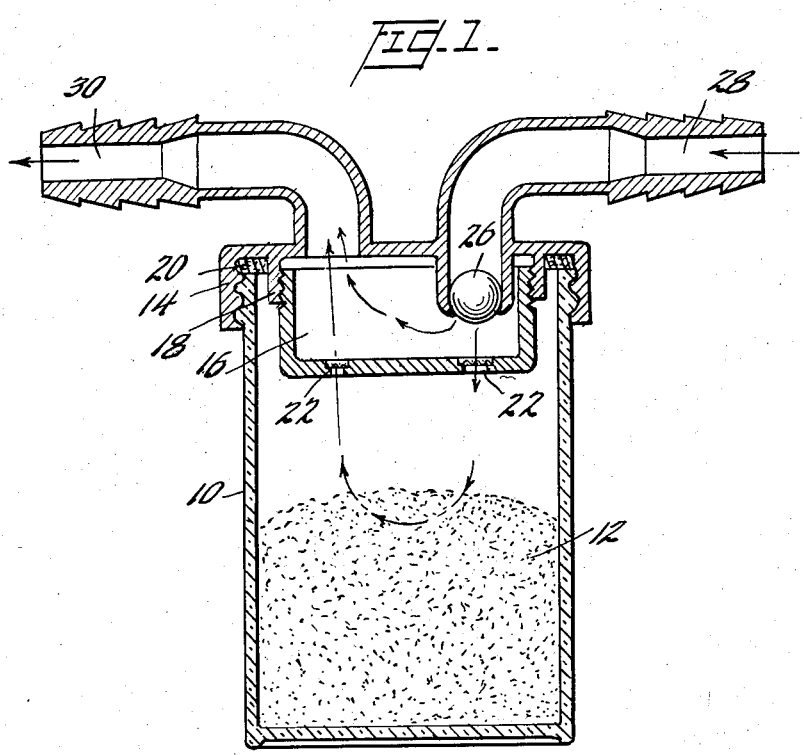
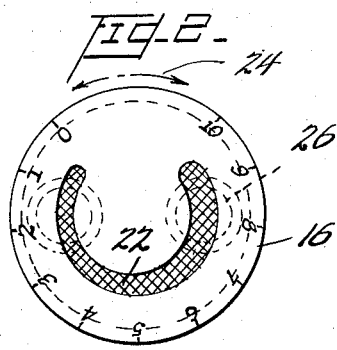
INVENTOR
Bror A. Lundquist,
BY Sommers & Young
ATTORNEYS

United States Patent Office 2,869,926
Patented Jan. 20, 1959

2,869,926

DEVICE FOR DISSOLVING AND MIXING SOLUBLE SOLID FERTILIZERS IN FLOWING WATER

Bror Axel Lundquist, Stockholm, Sweden

Application December 26, 1956, Serial No. 630,652

1 Claim. (Cl. 299—84)

This invention relates to a fertilizer mixing device of the type in which a water-carrying conduit extends through a fertilizer-holding tank with the pipe outlet in the top part of the tank.

According to the invention, the conduit communicates with the tank through at least one opening, preferably covered by close-meshed wire gauzes, in such a way that part of the liquid passing through the conduit flows into the tank at a certain point of the conduit and returns to the latter at another point, while the rest of liquid is conveyed past the tank.

In use, the conduit and practically the whole tank are filled with liquid, the liquid in the tank dissolving so much of the solid fertilizer that a saturated solution is obtained. The opening or openings covered by the close-meshed wire gauze according to the invention will provide for uniform water pressure in tank and conduit, and the water flowing into the tank will cause the water in the tank to circulate and drive part of it into the conduit where it will mix with the water that has passed through the conduit only. At the same time the fresh water entering the tank dissolves new quantities of the fertilizer.

It is obvious that the concentration of the fertilizer in the liquid finally discharging from the conduit will depend on the proportions between water passed directly through the conduit and water passed through the tank proper, and this fact makes it possible to regulate the concentration as required. Various arrangements can be used for effecting this controlled distribution of the liquid, and two of these are shown in the accompanying drawing, which illustrate two embodiments of the invention.

Fig. 1 is a sectional view of one embodiment, intended for small quantities of fertilizer.

Fig. 2 shows a screwable cup-shaped cap for use with this embodiment.

Referring now to the drawing, the numeral 10 in Fig. 1 designates a tank, such as a glass, which is partly filled with a water-soluble, grain-like fertilizer 12. The open end of the glass 10 is closed by a cover 14 having on its lower side a screwed-on cap 16. For this purpose the cover 14 is provided with a flange-like ring 18 and a sealing ring 20 sealing against the glass 10. The cap 16 is provided with an opening in the form of a slot, which extends centrically around the center of the cap and has a width narrowing along the length of the slot. This opening is covered by a wire gauze 22. By rotating the cap 16 as shown by the arrow 24 in Fig. 2, the portion of the opening located right underneath a pipe mouth 26 can be varied. Fitted in the cover 14 is a tube through one end 28 of which liquid is fed into the cap 16. The other end 26 of the tube is located directly above the slot-shaped opening. The rest of the liquid which is not admitted through the slot, flows out through a discharge tube 30 fitted in the cover 14. The liquid that has entered the tank 10 mixes with the saturated solution of fertilizer and liquid, discharges again through the portion of the slot that is not located underneath the feed tube end 26, and joins the liquid which discharges directly through the tube 30 without entering the tank. By screwing the cap 16 a wider or narrower portion of the slot opening can be brought directly beneath the tube end 26, so that the amount of liquid flowing through the slot into the tank, can be varied at will. This concentration is highest when the cap 16 occupies the position shown in Fig. 2 and lowest when the cap 16 is turned 180° from this position. The width of the slot-shaped opening can of course be chosen so as to allow adjustment for very varying concentrations.

The fertilizer mixer described above of course can be used also for mixing other substances, such as vermin and weed exterminators, with liquids of any kind.

I claim:

A device for continuously dissolving a granular fertilizer in water so as to provide a permanently saturated solution and mixing said solution in flowing water, comprising a tank holding said fertilizer and receiving water, said tank having an aperture therein, a cover closing said aperture in said tank, a liquid conduit communicating with the interior of said tank in such a way that part of the liquid flow enters the tank at one place of the path of the conduit and returns to the conduit at another place in said path, a liquid flow controlling means adjustably distributing part of the liquid flow into the tank and another part of the liquid flow directly to the outlet of said conduit, said liquid flow controlling means comprising a cup-shaped cap which is screwably fitted to the lower side of said cover and has a slot-shaped opening of enlarging width arranged circularly around its center, a wire gauze covering said slot-shaped opening to prevent undissolved fertilizer from leaving the tank, a feed pipe included in said liquid conduit extending through said cover into the cavity formed between said cap and cover to a point just above said slot-shaped opening, and a discharge pipe included in said liquid conduit being fitted in a hole provided in said cover diametrically opposite said feed pipe.

References Cited in the file of this patent

UNITED STATES PATENTS

| | | |
|---|---|---|
| 563,921 | Gridley | July 14, 1896 |
| 1,458,975 | Clauson | June 19, 1923 |
| 1,763,374 | Schrader | June 10, 1930 |
| 2,044,821 | Urban | June 23, 1936 |
| 2,178,735 | Behrman | Nov. 7, 1939 |